Figure 1:
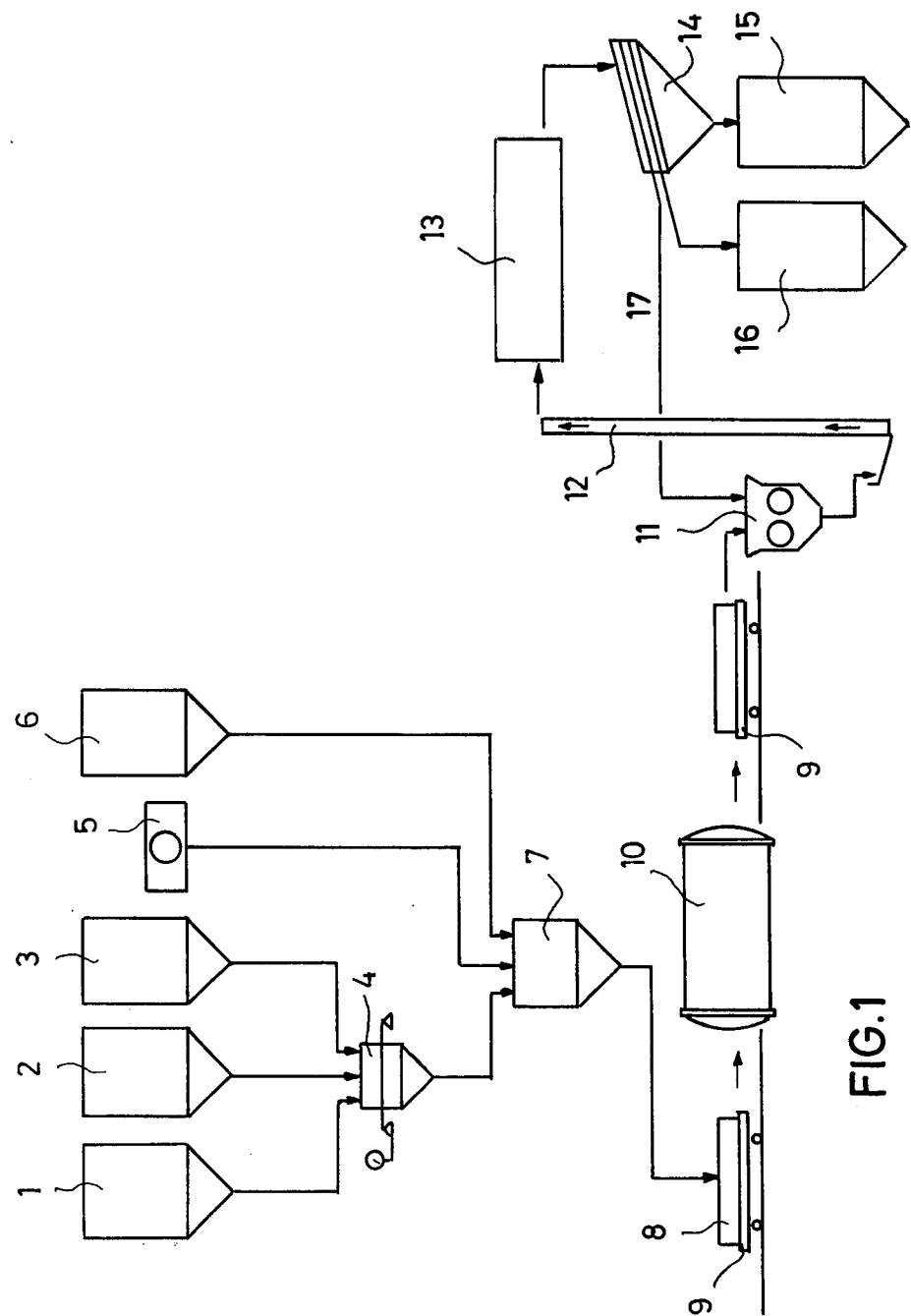

United States Patent [19]

Krämer et al.

[11] 4,275,684
[45] Jun. 30, 1981

[54] ANIMAL LITTER

[75] Inventors: Walter Krämer, Soltau-Friedrichseck; Rainer Follmann, Minden, both of Fed. Rep. of Germany

[73] Assignee: Effem GmbH, Verden, Fed. Rep. of Germany

[21] Appl. No.: 112,524

[22] Filed: Jan. 16, 1980

[30] Foreign Application Priority Data

Jan. 19, 1979 [DE] Fed. Rep. of Germany ....... 2902079

[51] Int. Cl.³ .............................................. A01K 1/015
[52] U.S. Cl. ....................................... 119/1; 424/357
[58] Field of Search ............................. 119/1; 424/357

[56] References Cited

U.S. PATENT DOCUMENTS

| 2,649,759 | 8/1953 | Gibbs | 119/1 |
| 2,895,873 | 7/1959 | Sawyer, Jr. et al. | 119/1 |
| 2,966,441 | 12/1960 | Vander Linden et al. | 424/357 |
| 3,553,321 | 1/1971 | Zilli et al. | 424/357 X |
| 4,163,674 | 8/1979 | Been | 119/1 X |

*Primary Examiner*—Gene Mancene
*Assistant Examiner*—Robert P. Swiatek
*Attorney, Agent, or Firm*—Merriam, Marshall & Bicknell

[57] ABSTRACT

An animal litter consisting of or containing a porous calcium silicate granulate or powder prepared by reacting silicon dioxide or materials containing the same with calcium oxide or materials containing the same in a CaO to $SiO_2$ molar ratio of 0.8:1 to 1.1:1, with homogenization thereof during the reaction by dispersing the solid starting materials in water with the addition of an anion-active surfactant previously converted in water to a microporous stable foam.

4 Claims, 2 Drawing Figures

ANIMAL LITTER

This invention relates to an improved animal litter.

Known animal litters are basically natural products of mineral or organic origin, such as pumice stone, clay minerals, e.g. sepiolites, sawdust and kieselguhr, which have hydrophilic and/or lipophilic properties because of their natural porosity. Organic products, however, have the disadvantage of undesirable side effects, e.g. combustibility, when they are used. On the other hand mineral products, such as clay minerals, tend to swell as a rule, due to the absorption of the liquids, mainly after the absorption capacity has been reached, and the result of this is a plastic consistency (softening) and caking. This is even more pronounced in the case of kieselguhr, which becomes very tacky, greasy and even pasty. These disadvantages necessarily result in difficulties when such products are handled. Pumice stone has the disadvantage of inadequate absorption. It is therefore used in mixture with sepiolites, and this again entails the aforementioned disadvantages of the latter.

Since these known animal litters are mainly natural products, they also have the disadvantage of relatively considerable variations as a rule in respect of their chemical and mineral composition, and they differ in respect of the nature and quantity of their impurities. The attempt has been made to compensate for these known disadvantages, e.g. by adding sand, but this again results in a reduction of the concentration of the active constituents, leading to reduced absorption of the products, without effectively eliminating the above adverse properties.

The object of this invention is to obviate the disadvantages of the prior art and provide a novel animal litter of reduced bulk density, better absorption, i.e. accelerated absorption with better absorption capacity (storage volume) and uniform particle structure, which does not swell, become tacky or greasy, does not smell when in contact with uric acid and in fact on the contrary eliminates smells, is bactericidal, does not evolve dust and does not stain.

The above problem has surprisingly been solved by the invention.

The invention relates to an animal litter which is characterised in that it consists of or contains a porous calcium silicate granulate or powder or, more specifically, calcium silicate hydrate granulate or powder, having pore radii of less than 500$\mu$.

The porous calcium silicate granulate or powder is preferably one with pore radii of less than 100$\mu$, more particularly less than 60$\mu$, and more particularly again 10 to 20$\mu$.

The product structure with the specified pore radii, preferably with micropores less than 100$\mu$, of the calcium silicate granulates or powders of the animal litters according to the invention is very important, since it ensures the required product properties such as high absorption capacity and low crude density (bulk density), and high compressive strength.

The calcium silicate granulate or powder of the animal litters according to the invention is preferably one whose pores have been formed by a preformed foam.

According to a particularly preferred embodiment of the invention, the calcium silicate granulate or powder of the animal litters according to the invention is one which is formed by reacting crystalline and, if required, amorphous silicon dioxide or materials containing the same, with calcium oxide or materials containing the same, in a CaO to $SiO_2$ molar ratio of 0.8:1 to 1.1:1, with homogenization thereof in water and molding, autoclave hardening, comminuting, drying and grading, with the further proviso that homogenization has been carried out during the reaction by dispersing the solid materials in water with the addition of an anion-active surfactant which has previously been converted to a microporous stable foam in water, in accordance with German Pat. application No. P 28 32 194.0, which has not yet been published. The anion-active surfactant can advantageously be a solution containing an active substance content (before being dissolved in water) of 30 to 60%, e.g. 50%. Alternatively, pulverulent products obtained by drying by dehydration may be used with an active substance content of up to 100%. Advantageously, the concentration of the anion-active surfactant in water for the microporous stable foam to be added for homogenization, is about 1.0 to 2.5%, more particularly 1.5%, when the anion-active surfactant used has an active substance content of 100%, and about 1.5 to 3.5%, more particularly 2%, when the anion-active surfactant used has an active substance content of from 30 to 60%. If the anion-active surfactant used does not have an active substance content of 100%, these concentrations refer to the product as actually used, i.e. the chemical product which may or may not be impure. For example, a 2% concentration of the anion-active surfactant in water in the case of an active substance content of 50% is equivalent to a concentration of 1% pure surfactant in water. Sodium lauryl sulphate is one example of an anion-active surfactant that can be used. It is also advantageous to produce the microporous stable foam by means of compressed air. A solution of the anion-active surfactant prepared by dilution with water is advantageously converted, in a very fine distribution, to a microporous stable foam in the compressed air, which, for example, is produced in an active foam generator. The microporous stable foam preferably has a weight of 30 to 80 g per liter, more particularly 50 to 60 g per liter. The anion-active surfactant (calculated on an undiluted basis) is preferably used in a quantity of from about 300 to 600 $g/m^3$ finished product.

The calcium silicate granulate or powder of the animal litters according to the invention may alternatively be produced in some other way, although with less favorable but nevertheless superior properties. For example, it can be produced by using an aggregate with a cellular structure, or be produced in the form of a calcareous sandstone.

Preferably, the calcium silicate granulate or powder with the specified pore radii constitutes 100% or substantially 100% of the animal litters according to the invention. It may be mixed with known animal litter products, such as sepiolites, or inert materials, such as sand, in which case the required properties, e.g. the absorption power, are less favorable.

The animal litters according to the invention have a low bulk density and high inherent particle strength and hence high compressive strength. For example, they may have bulk densities down to 250 $kg/m^3$ and compressive strengths of up to 10.2 $N/mm^2$ (Newton's per square mm) [1 Newton per square mm = 10 $kp/cm^2$].

The animal litters according to the invention are also distinguished by superior and always uniformly reproducible absorption and adsorption power. Their absorption capacity in respect of water (saturation water absorption) may be 200% by weight (in the case of a bulk density of 450 g/l) and more. In addition they have an accelerated absorbency, i.e. what is known as the blotting paper effect.

A great advantage of the animal litters according to the invention is that although their calcium silicate granulates or powders have high absorption power they do not swell, are not tacky and are not greasy unlike the most absorbent prior art products, even when they give optimum use, and therefore the novel animal litters do not soften nor do they evolve dust. In addition they are non-staining.

Another advantage is the uniform grain structure of the calcium silicate granulates or powders of the animal litters according to the invention. Their grain size, which can be adjusted by grading, is advantageously up to 5 mm, more particularly 1 to 4 mm.

Another advantage of the animal litters according to the invention is that even when they are subjected to optimum liquid saturation they do not release liquid when subjected to pressure.

The animal litters according to the invention are hydrophilically absorbent or adsorbent. This term is used to denote the absorption and adsorption of water and aqueous media, e.g. urine.

The calcium silicate granulates or powders of the animal litters according to the invention have an alkaline pH of generally 8.7 and 10, preferably 9 to 10, more particularly 9.4 to 9.8. They therefore have an acid-fixing action. For example, they can chemically neutralize the odor-forming compounds, e.g. uric acid, in animal urea and hence eliminate smells without additives, and this is a considerable advantage of the animal litters according to the invention.

Another advantage of the animal litters according to the invention is the bactericidal action of their calcium silicate granulates or powders.

A preferred application of the animal litters according to the invention is for cats (cat litter).

To summarize, the animal litters according to the invention have the considerable advantage over known animal litter products of superior absorption and adsorption (high absorption capacity and accelerated absorption) of their calcium silicate granulates or powders and, as already stated, the latter are not only stable in respect of shape and consistency, but also eliminate smells and have a bactericidal action.

As already stated, the calcium silicate granulates or powders of the animal litters according to the invention eliminate smells of themselves. It is also possible to use them together with deodorants, such as perfumed oils, which can be applied to them.

If required, the calcium silicate granulates or powders in the animal litters according to the invention may be combined with colored indicators to monitor the degree of saturation of absorption and adsorption. As a result the animal litter used can always be replaced at the right time.

Figure 2:
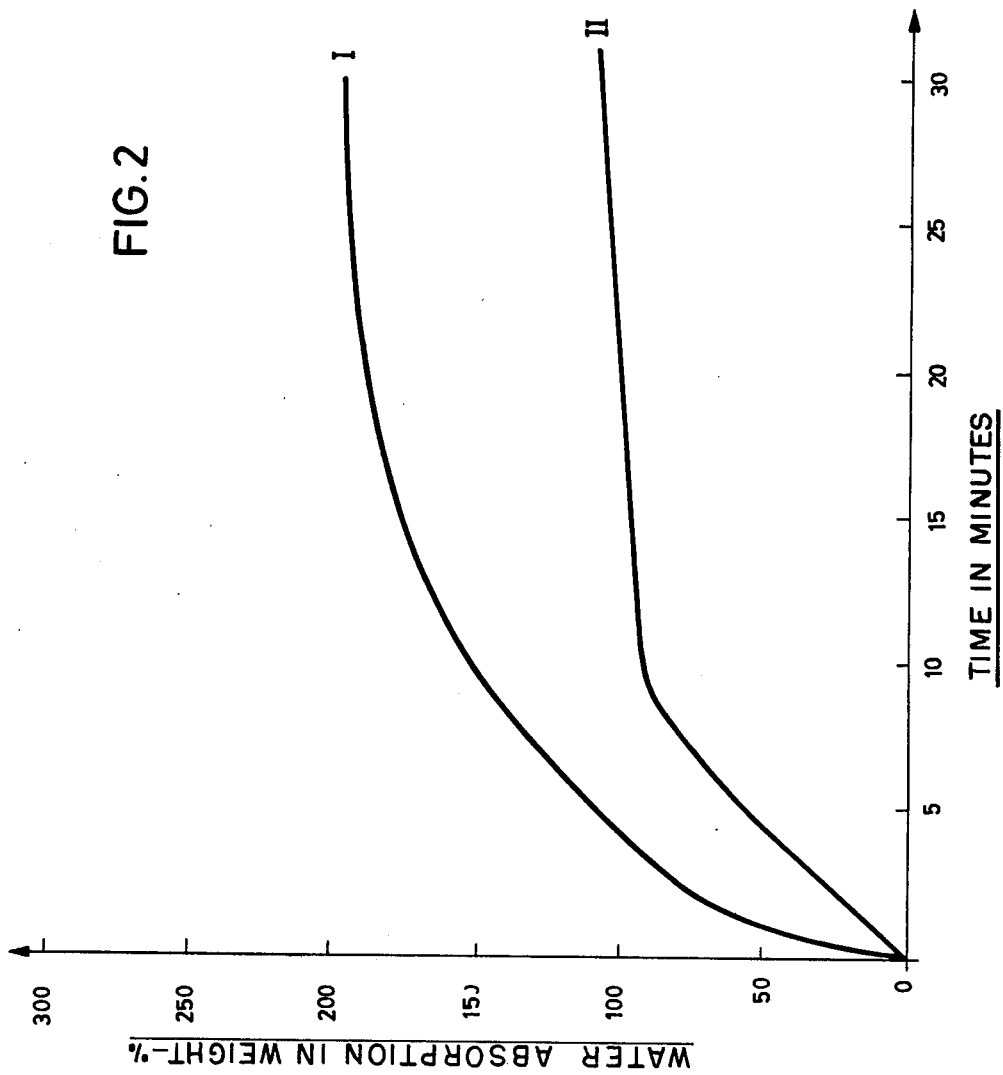

The invention will be explained in detail by reference to the following examples in conjunction with the accompanying drawings wherein:

FIG. 1 is a flow diagram of the production of an animal litter according to one embodiment of the invention, and FIG. 2 is a graph showing the water absorption over time in respect of an animal litter according to the invention and a commercial sepiolite-based product as a reference substance.

EXAMPLE 1

The calcium silicate granulate or powder used was prepared as follows with reference to FIG. 1:

The following solids were used as the starting material:

50.4% by weight of quartz powder having a grain size of less than 100μ
33.1% by weight of fine white lime
16.5% by weight of hydrate of lime
60% by weight of water with respect to the amount of solids initially used, was also used.

The quartz powder was fed from a quartz powder silo 1, the fine white lime was fed from a fine white lime silo 2 and the hydrate of lime was fed from a hydrate of lime silo 3 via a weighing machine 4 to a mixer 7 as a dispersing means. The mix water was also fed to this mixer 7 from a mix water tank 6.

A microporous stable foam was produced in an active foam generator 5 consisting of a compressor generating compressed air, and an intake nozzle which drew sodium lauryl sulphate with a 50% active substance content in 2% solution in water from a tank (not shown) and injected it into the compressed air by the injector principle. Very small air bubbles thus formed in a foam similar to whipped cream.

Mixing was then carried out in mixer 7, the solids being dispersed in the water, mixing being initially carried out for 4 minutes without foam and then the microporous stable foam produced as described above was introduced and worked into the mixture of staring solids and water for 2 minutes.

The mixture was then fed through a pipe to molding boxes 8 which were divided up into individual chambers by means of partitions. After a preliminary reaction time of 30 minutes at a temperature of 70° to 80° C., this temperature being produced by the slaking reaction heat of the fine white lime, the partitions were removed from the molding boxes. The boxes 8 with the resulting moldings were formed into a train 9 and driven into an autoclave 10 for hydrothermal setting. This took 7 hours (full pressure period) at a pressure of 12 atmospheres gauge.

The train 9 with the boxes 8 containing the hardened calcium silicate blocks were driven out of the autoclave 10 after expansion of the latter.

The boxes containing the hardened calcium silicate blocks were lifted from the train 9 by crane, and were turned through 90°. Since the edge parts of the boxes 8 were conical, they allowed the calcium silicate blocks to fall easily out of the boxes. After emptying, the boxes 8 were returned for the refilling cycle. The calcium silicate blocks removed from the boxes 8 were introduced by a front loader or via a pre-silo container, into a roll crusher 11 in which they were broken up. The broken calcium silicate was then fed to a dryer 13 by a belt elevator 12. The calcium silicate was dried to a residual moisture of about 3% in the dryer.

The dried calcium silicate containing particles of different particle sizes was fed to a screening machine 14 in which it was graded into a group with particles of up to 2.5 mm, which was collected in a container 15, and a group with particles of 2.5 to 4 mm, which was collected in another container 16. The oversize was returned to the roll crusher 11 via a return line 17. The first group was similarly separated again into a group containing particles less than 1 mm and a group containing particles of from 1 to 2.5 mm.

The average material parameters of the calcium silicate granulates or powders obtained was as follows:
Compressive strength (measured on compact molding before comminution) in N/mm$^2$
In the case of a crude density of 400 kg/m$^3$: 7.5
In the case of a crude density of 700 kg/m$^3$: 10.2
Crude density in kg/m$^3$: 400 to 700
Bulk density in kg/m$^3$: 250 to 500
(Bulk density of particle sizes up to 2.5 mm, in kg/m$^3$: 300 to 500
Bulk density of particle sizes up to 2.5 to 4 mm, in kg/m$^3$: 250 to 450)
Absorption capacity in respect of water (water absorption) (for a bulk density of 450 kg/m$^3$): 200% by weight
pH value: 9.4 to 9.8

In FIG. 2, the y-axis denotes the water absorption in % by weight while the x-axis denote the time in minutes. Curve I is the water absorption curve in the case of the calcium silicate granulate or powder prepared as described above for the animal litter according to the invention, while curve II is the water absorption curve for a sepiolite-based commercial product, the best cat litter product available commercially heretofore.

It will be clear from FIG. 2 that the calcium silicate granulate or powder is far superior to the commercial product in respect of absorption and adsorption, the water absorption being 200% by weight as against only 100% by weight. Since the former is also far superior to the latter in respect of smell elimination and the other respects enumerated hereinbefore, the former is very suitable as a superior animal litter. It was tried out in practice on a large number of cats.

EXAMPLE 2

The calcium silicate granulate or powder used was prepared as follows with reference to FIG. 1:
Example 1 was repeated except that the following solids were used as the starting materials:
50.4% by weight of quartz powder with a grain size of less than 100μ
42% by weight of quicklime
7.6% by weight hydrate of lime
The average material parameters of the calcium silicate granulates or powders produced were as follows:
Compressive strength (measured on compact molding before comminution) in N/mm$^2$
In the case of a crude density of 400 kg/m$^3$: 7.5
In the case of a crude density of 700 kg/m$^3$: 10.2
Crude density in kg/m$^3$: 400 to 700
Bulk density in kg/m$^3$: 250 to 500
(Bulk density of particle sizes up to 2.5 mm, in kg/m$^3$: 300 to 500
Bulk density of particle sizes up to 2.5 to 4 mm, in kg/m$^3$: 250 to 450)
Absorption capacity in respect of water (water absorption) (for a bulk density of 450 kg/m$^3$): 205% by weight
pH value: 9.4 to 9.8

The calcium silicate granulate or powder produced in this way was just as advantageous as an animal litter as the one produced in Example 1.

EXAMPLE 3

The calcium silicate granulate or powder used was prepared as follows with reference to FIG. 1:
Example 1 was repeated except that the following solids were used as the starting materials:
57% by weight of quartz powder with a grain size of less than 100μ
29% by weight of quicklime
14% by weight of hydrate of lime
The average material parameters of the calcium silicate granulates and powders obtained were as follows:
Compressive strength (measured on compact molding before comminution) in N/mm$^2$
In the case of a crude density of 400 kg/m$^3$: 6.5
In the case of a crude density of 700 kg/m$^3$: 8.5
Crude density in kg/m$^3$: 400 to 700
Bulk density in kg/m$^3$: 250 to 500
(Bulk density of particle sizes up to 2.5 mm, in kg/m$^3$: 300 to 500
Bulk density of particle sizes up to 2.5 to 4 mm, in kg/m$^3$: 250 to 450)
Absorption capacity in respect of water (water absorption): 208% by weight (for a bulk density of 450 kg/m$^3$)
pH value: 9.4 to 9.8

The calcium silicate granulate or powder produced in this way was equally advantageous as an animal litter to the one produced in Example 1.

We claim:

1. An animal litter consisting of or containing a porous calcium silicate granulate or powder having pore radii of less than 500μ, said calcium silicate granulate or powder being prepared by reacting crystalline and, if required, amorphous silicon dioxide, or materials containing the same, with calcium oxide or materials containing the same, in a CaO to SiO$_2$ molar ratio of 0.8:1 to 1.1:1, with homogenization thereof in water followed by molding, autoclave setting, comminuting, drying and grading with the further proviso that homogenization during the reaction has been carried out by dispersing the solid starting materials in water with the addition of an anion-active surfactant previously converted in water to a microporous stable foam.

2. An animal litter according to claim 1, characterized in that the porous calcium silicate granulate or powder has pore radii of less than 100μ, more particularly less than 60μ, specifically 10 to 20μ.

3. An animal litter according to claim 1, characterized in that an anion-active surfactant is used with an active substance content of from 30 to 60%, e.g. 50%.

4. A calcium silicate granulate according to claim 1 or 3, characterized in that the anion-active surfactant is sodium lauryl sulphate.

* * * * *